(12) United States Patent
Bhaskaran

(10) Patent No.: US 11,842,107 B2
(45) Date of Patent: Dec. 12, 2023

(54) SUBSCRIPTION-BASED PRINT JOB EXECUTION

(71) Applicant: Hewlett-Packard Development Company, L.P., Spring, TX (US)

(72) Inventor: Shinoj Bhaskaran, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/028,847

(22) PCT Filed: Jul. 1, 2021

(86) PCT No.: PCT/US2021/070814
§ 371 (c)(1),
(2) Date: Mar. 28, 2023

(87) PCT Pub. No.: WO2022/072958
PCT Pub. Date: Apr. 7, 2022

(65) Prior Publication Data
US 2023/0333787 A1    Oct. 19, 2023

(30) Foreign Application Priority Data

Jan. 10, 2020 (IN) .............................. 202041042709

(51) Int. Cl.
*G06F 3/12* (2006.01)
*H04N 1/00* (2006.01)

(52) U.S. Cl.
CPC .......... *G06F 3/1239* (2013.01); *G06F 3/1219* (2013.01); *H04N 1/00954* (2013.01); *G06F 3/1288* (2013.01); *H04N 1/00514* (2013.01)

(58) Field of Classification Search
CPC ........... H04N 1/00509; H04N 1/00514; H04N 1/00954; G06F 3/1219; G06F 3/1229; (Continued)

(56) References Cited

U.S. PATENT DOCUMENTS 7,461,138 B2    12/2008   Mukaiyama et al.
9,836,253 B2 *  12/2017   Tomono ................ G06F 3/1285
(Continued)

FOREIGN PATENT DOCUMENTS

JP    2014-179022 A    9/2014
WO   2014/120187 A1   8/2014
(Continued)

*Primary Examiner* — Scott A Rogers
(74) *Attorney, Agent, or Firm* — Brooks, Cameron & Huebsch, PLLC

(57) ABSTRACT

A non-transitory machine-readable storage medium encoded with instructions that, when executed by a processor of a computing device, cause the processor to associate a first subscription of a first user to a second subscription of a second user. The first subscription may correspond to a replaceable component of an image forming apparatus. A subscription service may enable the image forming apparatus to print a first number of pages and a second number of pages as part of the first subscription and second subscription, respectively. Further, the non-transitory machine-readable storage medium may include instructions to generate a print job including print content to be printed on the image forming apparatus, provide a user-selectable option to specify a category of the print content on a user interface, and selectively utilize the first subscription or the second subscription to execute the print job based on the specified category.

15 Claims, 4 Drawing Sheets

(58) Field of Classification Search
CPC .... G06F 3/1234; G06F 3/1239; G06F 3/1288; G06Q 10/087; G06Q 30/01–016; G06K 15/4065; G06K 15/407; G06K 15/4075
See application file for complete search history.

(56) References Cited

U.S. PATENT DOCUMENTS

| | | | |
|---|---|---|---|
| 10,185,524 B2 * | 1/2019 | Jain | G06F 3/1204 |
| 10,696,038 B2 | 6/2020 | Thomas-Lepore et al. | |
| 11,513,750 B2 * | 11/2022 | Hoopes | G06F 3/1204 |
| 2004/0044690 A1 | 3/2004 | Kanzinger | |
| 2005/0267797 A1 | 12/2005 | Takahashi et al. | |
| 2013/0229680 A1 | 9/2013 | Kitada et al. | |
| 2014/0092434 A1 | 4/2014 | Ida et al. | |
| 2017/0364315 A1 | 12/2017 | Jain et al. | |
| 2022/0321728 A1 * | 10/2022 | Minamiyama | G06F 3/1224 |
| 2023/0176801 A1 * | 6/2023 | Chin | G06Q 20/145 |
| | | | 358/1.15 |
| 2023/0234366 A1 * | 7/2023 | Kishimoto | B41J 2/17523 |
| | | | 347/86 |
| 2023/0289119 A1 * | 9/2023 | Hatada | H04N 1/00514 |
| | | | 358/1.15 |

FOREIGN PATENT DOCUMENTS

| | | |
|---|---|---|
| WO | 2019/212468 A1 | 11/2019 |
| WO | 2020/009000 A1 | 1/2020 |
| WO | WO-2023014402 A1 * | 2/2023 |

\* cited by examiner

SUBSCRIPTION-BASED PRINT JOB EXECUTION

BACKGROUND

Image forming apparatuses may be capable of performing functions such as printing documents, scanning documents, copying documents, and/or the like. An image forming apparatus may be a single function peripheral (SFP) or a multi-function peripheral (MFP). Example SFP may include a printer, a scanner, a copier, or the like that may perform one of the functions. Example MFP can incorporate the functionality of multiple devices in one, to perform a combination of some or all of a printer, a scanner; a photocopier, a fax machine, and the like. Such image forming apparatuses may include printer supplies that can be depleted with use. For example, laser printers may include toner cartridges (e.g., black and/or color) having a limited print capacity. In other examples, ink jet printers may include ink cartridges (e.g., black and/or color) having a limited print capacity. Such printer supplies may have to be replaced with use during the life of the image forming apparatus.

BRIEF DESCRIPTION OF THE DRAWINGS

Examples are described in the following detailed description and in reference to the drawings; in which.

DETAILED DESCRIPTION

Figure 1:
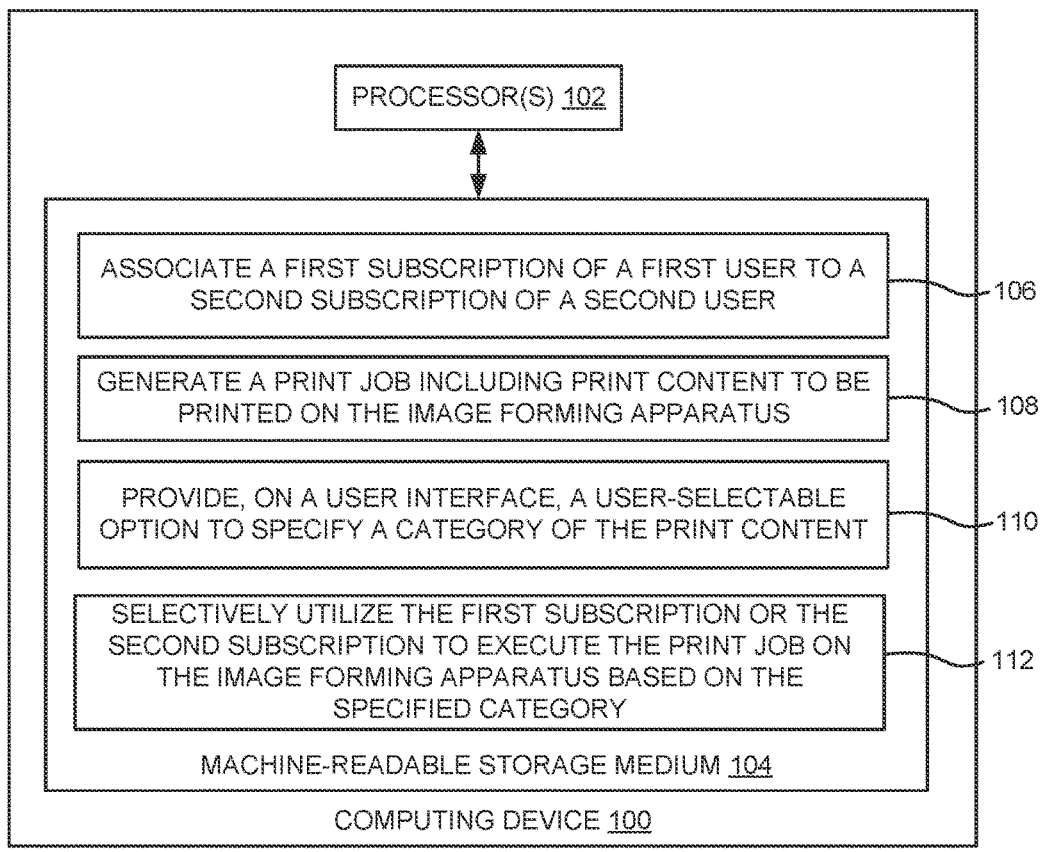
FIG. 1 is a block diagram of an example computing device including non-transitory machine-readable storage medium storing instructions to selectively utilize a first subscription or a second subscription to execute a print job on an image forming apparatus.

With work from home (WFH) option being opted by enterprises, one challenge that the enterprises may face is printing/copying of content. In enterprises, employees' day to day work may include printing a significant amount of content. In a work from home environment, each home-office employee may have a computing device and an image forming apparatus at home. Each home-office employee can connect the computing device to an enterprise computer network using a virtual private network (VPN) application to perform his/her work, but the home-office image forming apparatus may not be connected to a device management tool of the enterprise. In this example, the device management tool may refer to a tool that can be used to manage image forming apparatuses located on a local area network of the enterprise.

The home-office employee may print both work-related and non-work-related documents on the image forming apparatus located at home. In some examples, the home office employee may purchase a printer supply (e.g., ink cartridge, toner cartridge, paper, or the like) associated with the image forming apparatus and may submit an expense report to the enterprise for reimbursement. However, such systems may create an overhead for the enterprise to reimburse the home office employee. Also, in such systems, an administrator or a manager may not be able to ascertain how much of the printer supply cost is attributable to work-related printing and how much is attributable to private printing use. Thus, the enterprise may end up paying for the printing supply purchased by the home-office employee regardless of whether the image forming apparatus is used for work-related printing or non-work-related printing.

Further, enterprises may operate image forming apparatuses under contract-based management services that enable automated (or partially automated) delivery of a depleted resource (e.g., an ink or toner resource). The management services may refer to services offered by an external service provider to optimize or manage an enterprise's document output. The management service may be provided according to a subscription basis or a cost per page basis.

In a contract-based management service, a customer (e.g. user or enterprise) may enter into an agreement with the service provider to automatically replenish printer supplies in response to a detection that the printer supplies have reached specified low levels. For example, in the contract-based management service, a customer pays a periodic fee (e.g. a monthly fee, annual fee, or the like) to a service provider, and the service provider may monitor the supply of an image forming apparatus (or multiple image forming apparatuses) of the customer, and automatically replenishes the supply based on the monitoring.

An example of contract-based service is a managed print service (MPS), in which a service provider can remotely monitor image forming apparatuses at a site (or multiple sites) of an enterprise. In this example, the image forming apparatus can communicate an ink level or a toner level to the service provider. Upon detecting that the ink level or the toner level is less than a threshold, the respective printer supply can be automatically ordered and physically delivered to the enterprise.

In such contract-based services, even though the enterprise would have opted a deal that suits the printing frequency and behavior, the work from home option may impact the enterprise's plans, and may lead to wasted expenditure from the enterprise's point of view since the image forming apparatuses within the enterprise cannot be used by employees working from home.

Examples described herein may enable a user (e.g., employee) to register an image forming apparatus to a subscription service using a first subscription. The subscription service may be a printer supply replacement service. The first subscription may correspond to a printer supply and define a first number of pages that can be printed in accordance with the first subscription. Further, the first subscription may be linked/associated to a second subscription associated with an enterprise. The subscription service may define a second number of pages that can be printed on the image forming apparatus in accordance with the second subscription.

When a printer job (e.g., a print job or a copy job) is triggered, an option to specify the printer job as work-related or non-work-related may be provided on a user interface (e.g., of the image forming apparatus or a computing device). When the printer job is specified as work-related, the second subscription associated with the enterprise can be used to execute the printer job. In this example, a copy (e.g., a digital copy) of print content may be sent to an enterprise server for verification and the user may not incur any expense associated with the printer job. When the printer job is specified as non-work-related, the first subscription associated with the user can be used to execute the printer job and the user may incur an expense associated with the printer job.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

Turning now to the figures, FIG. 1 is a block diagram of an example computing device 100 including non-transitory machine-readable storage medium 104 storing instructions to selectively utilize a first subscription or a second subscription to execute a print job on an image forming apparatus. Computing device 100 may include a processor 102 and machine-readable storage medium 104 communicatively coupled through a system bus. Processor 102 may be any type of central processing unit (CPU), microprocessor, or processing logic that interprets and executes machine-readable instructions stored in machine-readable storage medium 104. Machine-readable storage medium 104 may be a random-access memory (RAM) or another type of dynamic storage device that may store information and machine-readable instructions that may be executed by processor 102. For example, machine-readable storage medium 104 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 104 may be non-transitory machine-readable medium. Machine-readable storage medium 104 may be remote but accessible to computing device 100.

As shown in FIG. 1, machine-readable storage medium 104 may store instructions 106-112. In an example, instructions 106-112 may be executed by processor 102 to selectively utilize a first subscription or a second subscription to execute a print job based on a category of the print job. Instructions 106 may be executed by processor 102 to associate a first subscription of a first user to a second subscription of a second user. Example second user may be an enterprise and example first user may be an employee of the enterprise. The first subscription may correspond to a replaceable component of an image forming apparatus (e.g., a network-enabled printer) of the first user. The terms "replaceable component" and "printer supply" may be used interchangeably throughout the document.

For example, the first subscription may be associated with a subscription service that delivers a replacement of the replaceable component, for instance, based on print consumption (e.g., ink consumption, toner consumption, and the like). Example replaceable component may include a print cartridge, such as an ink cartridge, a toner cartridge, or the like, that is being provided by a service provider in connection with the first subscription. In other examples, the first subscription may also include a subscription for other marking agents such as charcoal or chalk, other printing consumables, raw material for 3-dimensional (3D) printing, or the like.

Further, the subscription service may enable the image forming apparatus to print a first number of pages as part of the first subscription. Furthermore, the subscription service may enable the image forming apparatus to print a second number of pages as part of the second subscription, for instance, upon associating the first subscription with the second subscription.

Figure 2:
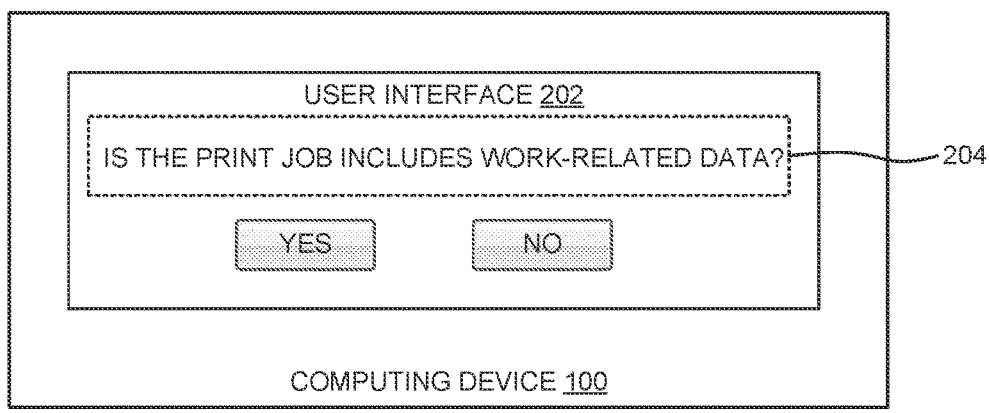
FIG. 2 is an example user interface, depicting a user-selectable option to specify a category of print content.

Instructions 108 may be executed by processor 102 to generate a print job including print content to be printed on the image forming apparatus. Instructions 110 may be executed by processor 102 to provide, on a user interface, a user-selectable option to specify a category of the print content. Example user interface may be provided on a display of computing device 100 in response to triggering the print job via a printer driver of computing device 100. FIG. 2 is an example user interface 202, depicting a user-selectable option 204 to specify the category of the print content.

Instructions 112 may be executed by processor 102 to selectively utilize the first subscription or the second subscription to execute the print job on the image forming apparatus based on the specified category. In an example, instructions to selectively utilize the first subscription or the second subscription may include instructions to:

utilize the second subscription to execute the print job in response to a determination that the specified category belongs to work-related data associated with the second user (e.g., when the user specifies the print job as work-related data via user-selectable option 204), and utilize the first subscription to execute the print job in response to a determination that the specified category does not belong to work-related data associated with the second user (e.g., when the user specifies the print job as non-work-related data via user-selectable option 204).

Further, machine-readable storage medium 104 may store instructions to transmit the print data to an enterprise server (e.g., of the enterprise) over a network when the print job is executed utilizing the second subscription (i.e., the specified category belongs to the work-related data). The enterprise server may be in a different network (e.g., a first local area network) than the computing device and the image forming apparatus (e.g., which may be in a second local area network).

Furthermore, machine-readable storage medium 104 may store instructions to maintain a first counter to count a number of pages printed using the first subscription and maintain a second counter to count a number of pages printed using the second subscription. In an example, the first counter and the second counter can be maintained in computing device 100 or the image forming apparatus. Further, computing device 100 or the image forming apparatus can communicate the count information associated with the first counter and the second counter to the subscription service.

Thus, the subscription service may monitor the number of pages printed on the image forming apparatus corresponding to the first subscription and the second subscription. Once the user has printed a subscribed number of pages corresponding to the first subscription, the image forming apparatus may stop printing non-work-related data unless the user makes an additional subscription. Similarly, once the user has printed subscribed number of pages corresponding to the second subscription, the image forming apparatus may stop printing work-related data unless the user obtains additional subscription from the second user.

Examples described herein may enable employees to print/copy work-related data from home-based image forming apparatuses using subscriptions associated with an enterprise. Also, the employees may not have to submit an expense report to the enterprise for reimbursement, thereby reducing process overhead for the enterprise to enable print from home. Also, the enterprise server may enable to analyze the received print data associated with the employees to determine whether the corresponding print job is work-related or non-work-related, thereby preventing a misuse of the enterprise's subscription. Also, examples described herein may not violate privacy issues of the employees since the enterprise may not be able to track the personal print or copy jobs.

Figure 3:
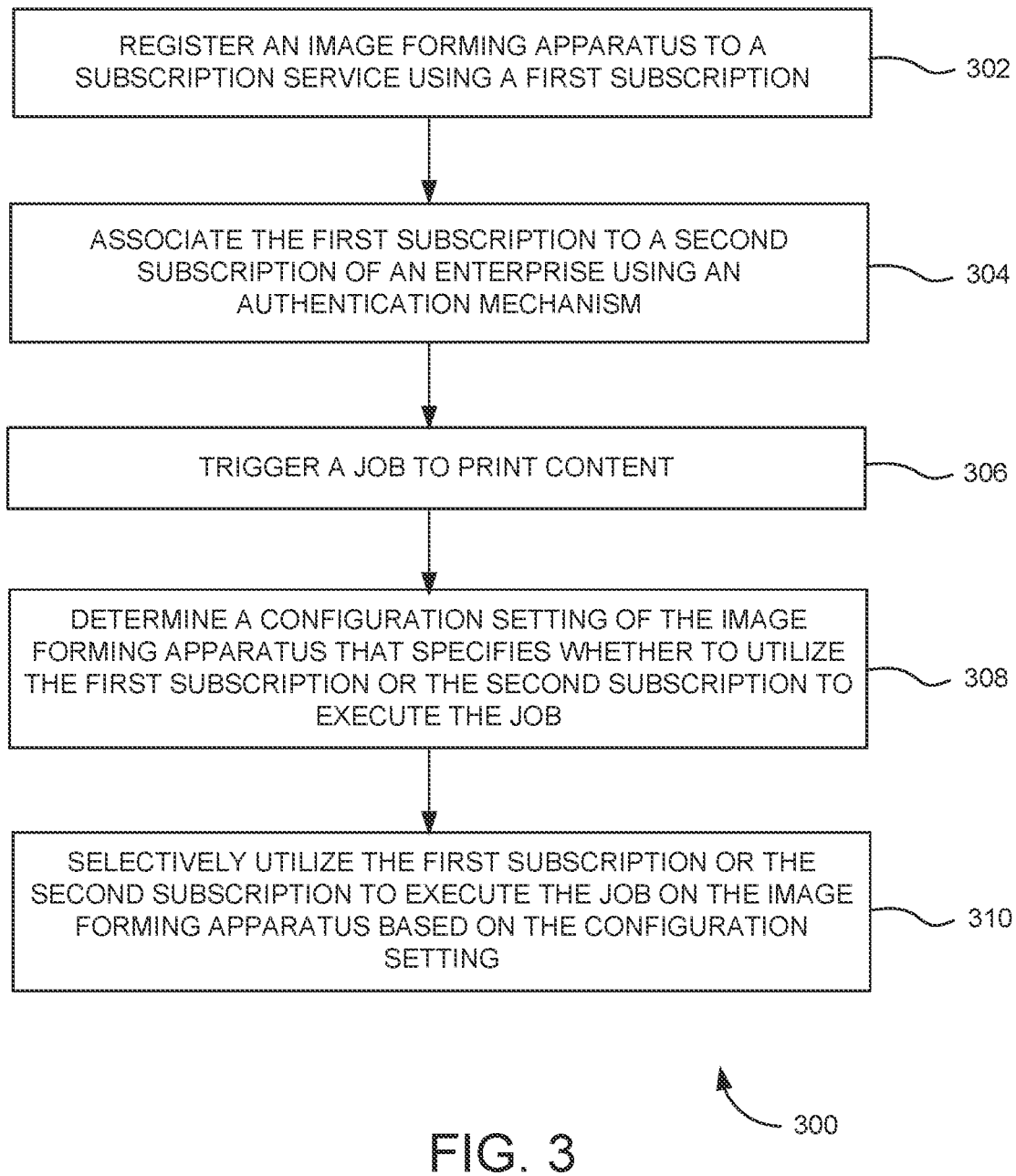
FIG. 3 is a flowchart illustrating an example method for selectively utilizing a first subscription or a second subscription to execute a job on an image forming apparatus based on a configuration setting.

FIG. 3 is a flowchart illustrating an example method 300 for selectively utilizing a first subscription or a second subscription to execute a job on an image forming apparatus based on a configuration setting. It should be understood that method 300 depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. The processes of method 300 may represent functions and/or actions performed by functionally equivalent circuits like analog circuits, digital signal processing circuits, application specific integrated circuits (ASICs), or other hardware components associated with the system. Furthermore, example method 300 may not be intended to limit the implementation of the present application, but rather example method 300 illustrates functional information to design/fabricate circuits, generate machine-readable instructions, or use a combination of hardware and machine-readable instructions to perform the illustrated processes.

At 302, an image forming apparatus may be registered to a subscription service using a first subscription. The subscription service may provide a replaceable component of the image forming apparatus and define a first number of pages that can be printed as part of the first subscription. For example, the subscription service can communicate with the image forming apparatus to check a status of printing material of the replaceable component, and further to perform actions that replenish the printing material on the image forming apparatus. As part of the first subscription, the subscription service may physically deliver (e.g., through shipping service) a replacement for the replaceable component.

At 304, the first subscription may be associated to a second subscription of an enterprise using an authentication mechanism. The enterprise may have the second subscription with the subscription service and define a second number of pages that can be printed on the image forming apparatus.

At 306, a job may be triggered to print content. Example job may include a print job or a copy job. In one example, the print job may be triggered on the image forming apparatus via a computing device. In another example, the copy job may be triggered directly on the image forming apparatus. At 308, a configuration setting of the image forming apparatus that specifies whether to utilize the first subscription or the second subscription to execute the job may be determined, for instance, in response to triggering the job.

Example configuration setting may include a user-enabled feature that can be selected prior to triggering the job or in response to triggering the job via a user interface. In one example, a user of the image forming apparatus can specify the enterprise's unique identifier during the first subscription to get the first subscription linked to the second subscription. The first subscription can be linked to the second subscription based on the authentication mechanism. In another example, the first subscription can be linked to the second subscription by the user using a unique identifier (e.g., a passcode) shared by the enterprise.

At 310, the first subscription or the second subscription may be selectively utilized to execute the job on the image forming apparatus based on the configuration setting. In one example, selectively utilizing the first subscription or the second subscription to execute the job may include executing the job using the first subscription when the configuration setting specifies to utilize the first subscription to execute the job.

In another example, selectively utilizing the first subscription or the second subscription to execute the job may include executing the job using the second subscription when the configuration setting specifies to utilize the second subscription to execute the job. Further, a copy of the print content may be transmitted to an enterprise server over a network when the job is executed utilizing the second subscription. The enterprise server may be in a different network than the image forming apparatus.

Figure 4:
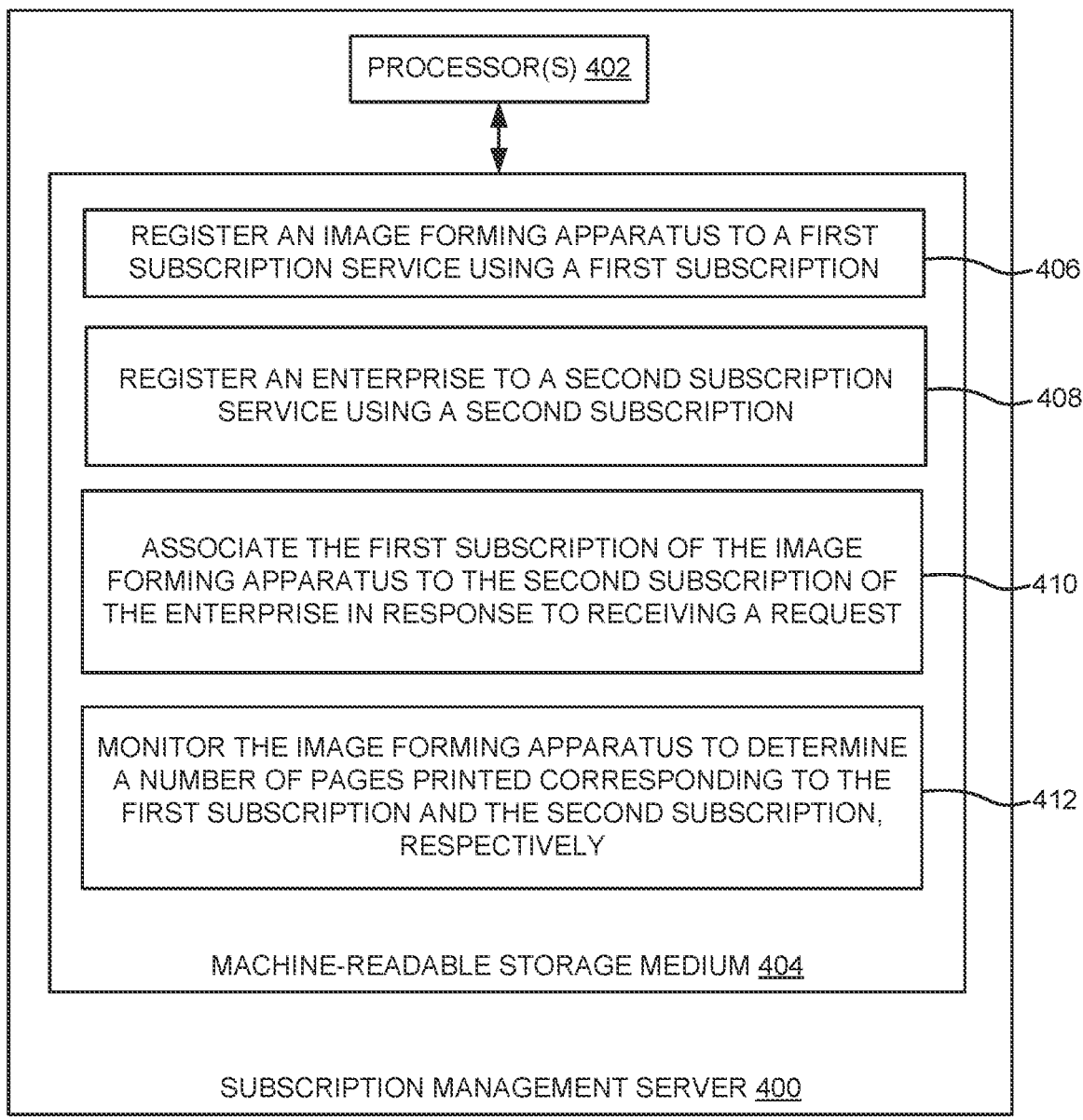
FIG. 4 is a block diagram of an example subscription management server including non-transitory machine-readable storage medium storing instructions to monitor an image forming apparatus to determine a number of pages printed corresponding to a first subscription and a second subscription.

FIG. 4 is a block diagram of an example subscription management server 400 including non-transitory machine-readable storage medium 404 storing instructions to monitor an image forming apparatus to determine a number of pages printed corresponding to a first subscription and a second subscription. Subscription management server 400 may include a processor 402 and machine-readable storage medium 404 communicatively coupled through a system bus. Processor 402 may be any type of central processing unit (CPU), microprocessor, or processing logic that interprets and executes machine-readable instructions stored in machine-readable storage medium 404. Machine-readable storage medium 404 may be a random-access memory (RAM) or another type of dynamic storage device that may store information and machine-readable instructions that may be executed by processor 402. For example, machine-readable storage medium 404 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 404 may be non-transitory machine-readable medium. Machine-readable storage medium 404 may be remote but accessible to subscription management server 400.

As shown in FIG. 4, machine-readable storage medium 404 may store instructions 406-412. In an example, instructions 406-412 may be executed by processor 402 to monitor a number of pages printed corresponding to the first subscription and the second subscription. Instructions 406 may be executed by processor 402 to register an image forming apparatus to a first subscription service using a first subscription. The first subscription service may provide a replaceable component and define a first number of pages that can be printed as part of the first subscription.

In an example, a user can register the image forming apparatus (e.g., a network-enabled printer) with a service provider so that the image forming apparatus can communicate with the service provider over a network. The user can initiate a registration process for the first subscription service using the user's computing device, such as a smartphone, tablet device, a personal computer, laptop, or the like. For example, the service provider can provide a portal via a webpage (e.g., on a browser program) or a designated print application (e.g., downloaded and stored on the computing device) that the user can access using the computing device to initiate the registration process for the first subscription service. In some examples, the registration process can require the user to create an account or profile with the remote service provider and provide user information, such as the user's name, email address, and password for the account.

In some examples, the registration process may enable the user to select an ink subscription plan from a plurality of different ink subscription plans. As discussed, the user can select from a variety of different plans based on the user's printing habits and printing frequency. A first plan, for example, can be suitable for an occasional print user, which enables the user to print up to 50 pages for $2.99 per month, while a second plan can be suitable for a frequent print user, which enables the user to print up to 300 pages for $9.99 per month.

As part of the registration process, the user can also provide other user information, such as user profile information, payment information, billing information, and/or shipping information. The payment and billing information can be used by the service provider to charge the user for the first subscription service rendered on behalf of the user, while the shipping information can provide a designated location in which replaceable components can be physically mailed or shipped to the user. Depending on implementation, the user can provide the payment information, the billing information, and/or the shipping information by manually inputting the information via the portal or through any other user action.

As part of the first subscription, the image forming apparatus may receive a replaceable component, such as an ink cartridge or a toner cartridge, to enable the image forming apparatus to perform print operations. For example, the replaceable component can be provided by the service provider in connection with the user's registered first subscription service. When the image forming apparatus receives the replaceable component, the image forming apparatus can verify the replaceable component (e.g., authenticate/authorize the replaceable component) before enabling the print operations to be performed.

Instructions 408 may be executed by processor 402 to register an enterprise to a second subscription service using a second subscription. The second subscription service may define a second number of pages that can be printed as part of the second subscription. In an example, an administrator of the enterprise can initiate a registration process for the second subscription service using an associated computing device. For example, the service provider can provide a portal via a webpage (e.g., on a browser program) or a designated print application (e.g., downloaded and stored on the computing device) that the administrator can access using the computing device to initiate the registration process for the second subscription service.

As part of the second subscription service, the administrator can select from a variety of different plans, a first plan that enables the user to print up to 50 pages for $2.99 per month, a second plan that enables the user to print up to 300 pages for $9.99 per month, or the like.

Instructions 410 may be executed by processor 402 to associate the first subscription of the image forming apparatus to the second subscription of the enterprise in response to receiving a request. In an example, instructions to associate the first subscription of the image forming apparatus to the second subscription may include instructions to:
  receive the request including unique identification information to associate the first subscription and the second subscription. The request may be received from a user associated with the first subscription or from the enterprise associated with the second subscription.
  associate the first subscription of the image forming apparatus to the second subscription of the enterprise upon authenticating the unique identification information.

In other examples, the administrator of the enterprise may be enabled to divide the second subscription into a set of sub-subscriptions. Each sub-subscription may define a threshold number of pages that can be printed. The threshold number of pages may be less than the second number of pages. In this example, the first subscription of the image forming apparatus may be associated with a sub-subscription of the set of sub-subscriptions in response to receiving the request. For example, the enterprise may subscribe for 1000 pages that can be printed as part of the second subscription. Further, the enterprise can divide the second subscription into multiple equal sub-subscriptions (e.g., each sub-subscription with 100 pages) or un-equal sub-subscriptions (e.g., a first sub-subscription with 200 pages, a second sub-subscription with 50 pages, and so on). In yet another example, the enterprise can opt for multiple sub-subscriptions from the second subscription service and assign each sub-subscription to a different employee.

Instructions 412 may be executed by processor 402 to monitor the image forming apparatus to determine a number of pages printed corresponding to the first subscription and the second subscription, respectively. In other examples, instructions to monitor the image forming apparatus may include instructions to:
  monitor the image forming apparatus to determine a residual quantity (e.g., an ink level, a toner level, or the like) of printing material in the replaceable component, and
  trigger an alert to deliver a new replaceable component according to the first subscription in response to a determination that the residual quantity of the printing material is less than a threshold.

Further, instructions to monitor the image forming apparatus to determine the number of pages printed corresponding to the first subscription and the second subscription may include instructions to obtain a number of pages printed corresponding to a job from the image forming apparatus upon execution of the job, the number of pages printed based on the first subscription or the second subscription. In this example, the image forming apparatus can communicate the number of pages printed based on the first subscription or the second subscription to subscription management server 400. In one example, a first counter may be updated when the obtained number of pages printed corresponds to the first subscription. In another example, a second counter may be updated when the obtained number of pages printed corresponds to the second subscription.

For example, upon successful completion of a job, a tamper resistant first counter or a tamper resistant second counter (e.g., at the image forming apparatus) may be incremented/updated to reflect the fact that a certain number of pages were printed corresponding to the first subscription or the second subscription, respectively, and transmit the updated information associated with the first and second counters to subscription management server 400 along with the remaining quantity of the printing material. The first and second counters at subscription management server 400 may keep track of the number of printed pages to prevent the user from exceeding an allowed allotment of pages corresponding to the first and second subscriptions. The service provider may monitor the remaining quantity of the printing material and ship the replaceable component to the user according to the user's first subscription service.

Thus, subscription management server 400 may monitor the number of pages printed on the image forming apparatus corresponding to the first subscription and the second subscription after the user associates/maps the first subscription and the second subscription. Once the user has printed subscribed number of pages corresponding to the first subscription and the second subscription, the image forming apparatus may stop printing unless the user makes supplemental subscription. With enablement of the first subscription service, users may not have to face trivial bottlenecks, such as ink replacement, degradation of print-quality if one of ink cartridges gets emptied, figure out cost-to-print, or the like. When the user enrolls in the first subscription service, a periodic fee (e.g., monthly fee, half yearly fee, yearly fee, or any other suitable period) may be paid to print a defined number of pages per month. In the above examples, the first subscription and the second subscription may be based on the number of pages that can be printed in a period of time.

Figure 5:
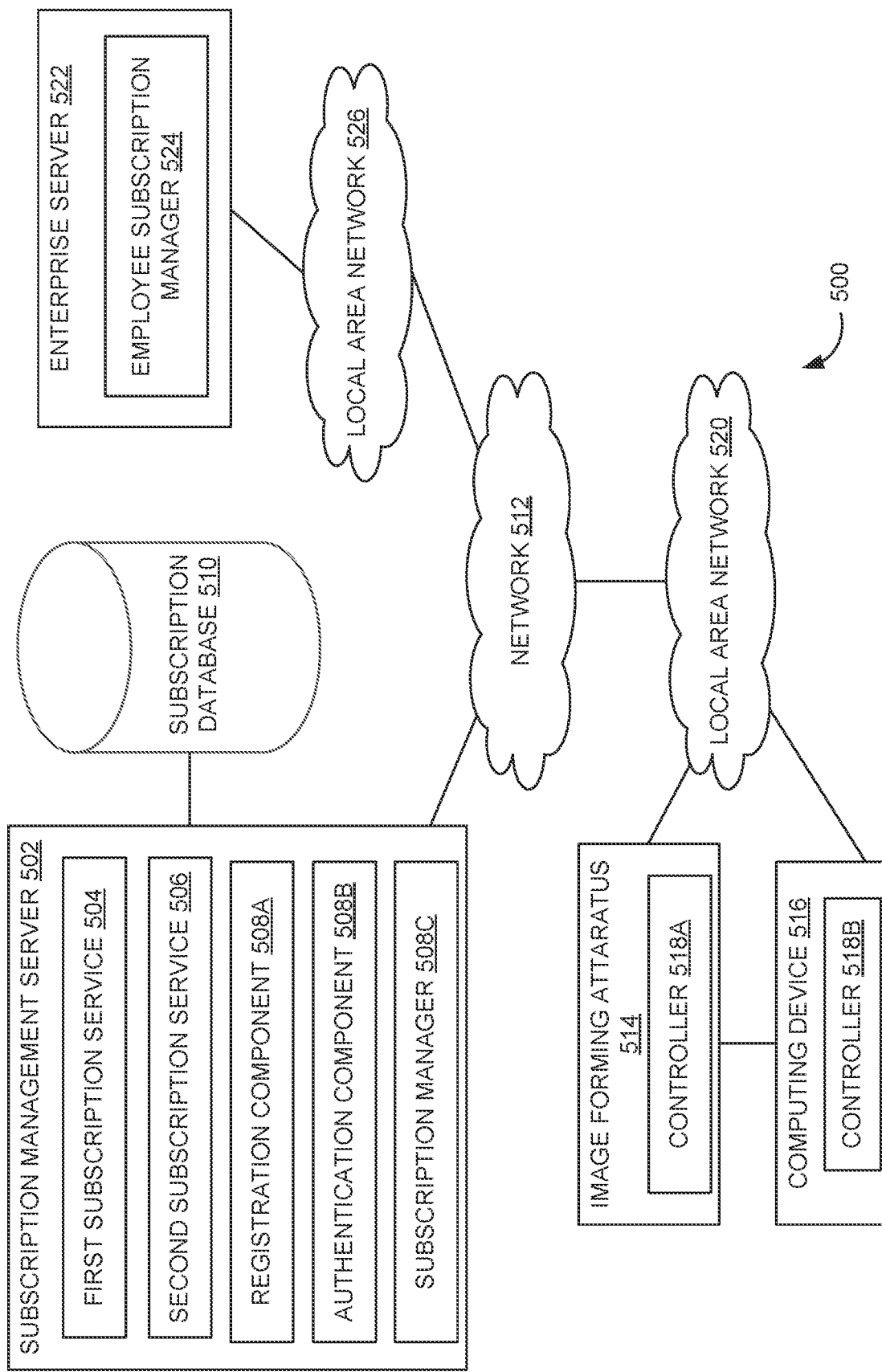
FIG. 5 is a block diagram of an example system architecture, including a subscription management server to monitor an image forming apparatus for a number of pages printed and remaining quantity of printing material.

FIG. 5 is a block diagram of an example system architecture 500, including a subscription management server 502 to monitor an image forming apparatus 514 for a number of pages printed and remaining quantity of printing material. Example image forming apparatus 514 can be a laser beam printer (e.g., using an electrophotographic method for printing), an ink jet printer (e.g., using an ink jet method for printing), or the like. Example subscription management server 502 may be a cloud-based server. As shown in FIG. 5, subscription management server 502 may be coupled over a network 512 to image forming apparatus 514. Network 512 may be, for instance, the Internet or an Intranet (e.g., a wide area network (WAN)) servicing an organization of networked computers. Moreover, image forming apparatus 514 may be coupled with subscription management server 502 over network 512 via a local area network (LAN) 520. Image forming apparatus 514 may be coupled to LAN 520 via a wired or wireless (e.g., a Bluetooth, 802.11, or the like) connection. In another example, image forming apparatus 514 may be directly coupled with network 512 via an access point such as a modem. Example modem may be internal or external to image forming apparatus 514.

Further, image forming apparatus 514 may be accessed by a computing device 516 such as a personal computer (PC), tablet computer, portable computing device (e.g., smartphone), or any other device executing a remote computer application over LAN 520 via a wired or wireless connection. The remote computer application (e.g., a printer driver) may include software for contacting and engaging with image forming apparatus 514 to create print jobs. In other examples, image forming apparatus 514 may include an email print function which allows a user to print a document by emailing the document to an email address associated with image forming apparatus 514.

Furthermore, system architecture 500 may include an enterprise server 522 connected to subscription management server 502 over network 512 via a local area network (LAN) 526. In another example, enterprise server 522 may be directly coupled with the network 512 via an access point.

In one example, subscription management server 502 may include a first subscription service 504, a second subscription service 506, a registration component 508A, an authentication component 508B, and a subscription manager 508C. Registration component 508A, authentication component 508B, and subscription manager 508C may be implemented as engines or modules including any combination of hardware and programming to implement the functionalities of the modules or engines described herein. The functions of registration component 508A, authentication component 508B, and subscription manager 508C may also be implemented by a processor. In examples described herein, processor may include, for example, one processor or multiple processors included in a single device or distributed across multiple devices.

System architecture 500A may also include a subscription database 510 to store information pertaining to registered users, enterprises, and image forming apparatuses associated with first and/or second subscription services 504 and 506. Registration component 508A may be operative to enroll users/image forming apparatuses to first subscription service 504 and enterprises to second subscription service 506. In an example, first subscription service 504 and second subscription service 506 may be provided by a service provider.

In one example, registration component 508A may enable a user to register image forming apparatus 514 to first subscription service 504. In another example, upon enrolling for first subscription service 504, first subscription service 504 may provide image forming apparatus 514 along with a replaceable component to the user. The user can select a subscription plan that is suitable for the user's printing frequency and receive the replaceable component from the service provider accordingly. Further, as part of first subscription service 504, the replaceable component can be automatically ordered and physically delivered to the user in response to detecting that an ink or a toner level of the replaceable component is less than a threshold. By using first subscription service 504, the user can receive the replaceable component for printing and always have the capability to print from image forming apparatus 514.

Example replaceable component may include a print cartridge or a plurality of print cartridges corresponding to different ink colors. In such examples, the first subscription service may monitor a quantity of ink in each ink color remaining in the corresponding print cartridges. Further, first subscription service 504 may define a first number of pages that can be printed for a period of time (e.g., a month) as part of the subscription.

Further, registration component 508A may enable the enterprise to register to second subscription service 506, which defines a second number of pages that can be printed for the period of time as part of the subscription. Furthermore, authentication component 508B may be operative to associate/map subscriptions associated with users/image forming apparatuses to subscriptions associated with the enterprises using an authentication mechanism. In the above example, the subscription of the user may be associated to the subscription of the enterprise such that image forming apparatus 514 can execute the print job or the copy job using either the first subscription service or the second subscription service. For example, a user identifier (ID), email, employee ID, mobile number, and the like can be used to associate/map the subscription of the user to the subscription of the enterprise.

Subscription manager 508C may manage subscriptions associated with first subscription service 504 and second subscription service 506. Information provided by users and enterprises may be stored securely in the subscription database 510. This information may include identification information, financial information (e.g., credit card or bank account information), printer hardware information, or the like. Registration unit 508A may serve as the point of contact for enrolling in first subscription service 504 and second subscription service 506. Enrollment may include providing the identification, financial, and/or printer hardware information necessary for the first and second subscription services 504 and 506 to perform associated functions as well as setting up an account such as a user identifier (ID) and password. Once enrolled, a user (e.g., employee) and an enterprise may execute a subscription agreement that sets out the parameters of use of replaceable component of a particular image forming apparatus.

Furthermore, enterprise server 522 of the enterprise may include an employee subscription manager 524. Employee subscription manager 524 may monitor the subscriptions of the enterprise with the second subscription service 506 and manage allocations of the subscriptions to the users (e.g., employees of the enterprise), Employee subscription manager 524 may enable to set a maximum number of subscriptions that can be supported for the enterprise according to a subscription plan and also manage the mapped subscriptions between the users and the enterprise. For example, employee subscription manager 524 may allocate the second number of pages associated with second subscription service 506 to image forming apparatus 514, monitor the number of pages printed on image forming apparatus 514 corresponding to second subscription service 506, and also can provide additional subscription (e.g., in addition to the second number of pages) to image forming apparatus 514 based on the monitoring.

During operation, when a print job or copy job is triggered on image forming apparatus 514, a user-selectable option to specify a category of the print job or the copy job may be provided on a user interface. In one example, when the print job is generated via computing device 516, then controller 518B in computing device 516 may provide the user-selectable option on a user interface of computing device 516. In another example, when the user sends an email including the print job to an email address associated with image forming apparatus 514 via computing device 516, controller 518B may enable the user to select the user-selectable option in the email prior to sending the email. In yet another example, when the print job or copy job is triggered on image forming apparatus 514, then controller 518A in image forming apparatus 514 may provide the user-selectable option on a user interface of image forming apparatus 514.

Further, controller 518A or 518B may utilize second subscription service 506 to execute the print job or the copy job in response to a determination that the specified category belongs to work-related data associated with the enterprise. In one example, controller 518B may transmit a document associated with the print job or the copy job to enterprise server 522 over network 512. In another example, controller 518A may transmit scan output data associated with the copy job to enterprise server 522 over network 512. In this example, controller 518A or 518B may store enterprise server's email address to transmit the copy of the print job. Furthermore, controller 518A or 518B may utilize first subscription 504 to execute the print job or copy job in response to a determination that the specified category does not belong to work-related data associated with the enterprise.

Further, controller 518A or 518B may maintain a first counter to count a number of pages printed using first subscription service 504 and maintain a second counter to count a number of pages printed using second subscription service 506. Controller 518A or 518B can communicate the count information associated with the first counter and the second counter to subscription manager 508. Thus, subscription manager 508 may monitor the number of pages printed on image forming apparatus 514 corresponding to first subscription service 504 and second subscription service 506 and also store the monitored count information in a storage (e.g., subscription database 510).

For example, when the quantity of ink or toner level in the replaceable component falls below a threshold quantity, subscription manager 508C may output a command to ship a new cartridge to the user of image forming apparatus 514. Subscription manager 508C may output such commands without limitation, i.e., any number of times whenever the quantity of ink or toner level in the replaceable component falls below the threshold quantity. The user can execute printing processes on image forming apparatus 514 using the cartridges until the preset number of pages (e.g., corresponding to first subscription service 504 and second subscription service 506) for a prescribed period has been printed.

Subscription manager 508C may have the capability to block further printing on image forming apparatus 514 when the main quota associated with first subscription service 504 and second subscription service 506 has been used, without further payments for additional quota. As an example, if the prescribed period is one month and the preset number of pages is 50 and 150 corresponding to first subscription service 504 and second subscription service 506, the user can print up to 200 pages within a single month. After printing the preset number of pages, the user may be charged with a fee corresponding to the number of printed pages over 200 pages (e.g., the preset number).

Thus, examples described herein may enable the enterprise to sponsor official prints done from an "work from home" employee by linking the first subscription service of the employee to the second subscription service of the enterprise and also provide a solution to limit the print performed using the second subscription service to official printing.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and/or any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A non-transitory machine-readable storage medium encoded with instructions that, when executed by a processor of a computing device, cause the processor to:

associate a first subscription of a first user to a second subscription of a second user, the first subscription corresponding to a replaceable component of an image forming apparatus, and wherein a subscription service is to enable the image forming apparatus to print a first number of pages and a second number of pages as part of the first subscription and second subscription, respectively;

generate a print job including print content to be printed on the image forming apparatus;

provide, on a user interface, a user-selectable option to specify a category of the print content; and selectively utilize the first subscription or the second subscription to execute the print job on the image forming apparatus based on the specified category.

2. The non-transitory machine-readable storage medium of claim 1, wherein instructions to selectively utilize the first subscription or the second subscription comprise instructions to:

utilize the second subscription to execute the print job in response to a determination that the specified category belongs to work-related data associated with the second user; and utilize the first subscription to execute the print job in response to a determination that the specified category does not belong to work-related data associated with the second user.

3. The non-transitory machine-readable storage medium of claim 1, further comprising instructions to:

transmit print data to an enterprise server over a network when the print job is executed utilizing the second subscription, wherein the enterprise server is in a different network than the computing device and the image forming apparatus.

4. The non-transitory machine-readable storage medium of claim 1, wherein the replaceable component comprises a print cartridge that is being provided by a service provider in connection with the first subscription.

5. The non-transitory machine-readable storage medium of claim 1, further comprising instructions to:

maintain a first counter to count a number of pages printed using the first subscription; and maintain a second counter to count a number of pages printed using the second subscription.

6. A method comprising:

registering an image forming apparatus to a subscription service using a first subscription, wherein the subscription service is to provide a replaceable component of the image forming apparatus and define a first number of pages that can be printed as part of the first subscription;

associating the first subscription to a second subscription of an enterprise using an authentication mechanism, the enterprise having the second subscription with the subscription service and defining a second number of pages that can be printed on the image forming apparatus;

triggering a job to print content;

determining a configuration setting of the image forming apparatus that specifies whether to utilize the first subscription or the second subscription to execute the job; and selectively utilizing the first subscription or the second subscription to execute the job on the image forming apparatus based on the configuration setting.

7. The method of claim 6, wherein the job comprises a print job or a copy job.

8. The method of claim 6, wherein selectively utilizing the first subscription or the second subscription to execute the job comprises:

executing the job using the second subscription when the configuration setting specifies to utilize the second subscription to execute the job; and executing the job using the first subscription when the configuration setting specifies to utilize the first subscription to execute the job.

9. The method of claim 8, further comprising:

transmitting a copy of the print content to an enterprise server over a network when the job is executed utilizing the second subscription, wherein the enterprise server is in a different network than the image forming apparatus.

10. The method of claim 6, wherein the configuration setting of the image forming apparatus comprises a user-enabled feature that can be selected prior to triggering the job or in response to triggering the job via a user interface.

11. A non-transitory machine-readable storage medium encoded with instructions that, when executed by a processor of a subscription management server, cause the processor to:

register an image forming apparatus to a first subscription service using a first subscription, the first subscription service providing a replaceable component and define a first number of pages that can be printed as part of the first subscription;

register an enterprise to a second subscription service using a second subscription, the second subscription service defining a second number of pages that can be printed as part of the second subscription;

associate the first subscription of the image forming apparatus to the second subscription of the enterprise in response to receiving a request; and monitor the image forming apparatus to determine a number of pages printed corresponding to the first subscription and the second subscription, respectively.

12. The non-transitory machine-readable storage medium of claim 11, wherein instructions to monitor the image forming apparatus comprise instructions to:

monitor the image forming apparatus to determine a residual quantity of printing material in the replaceable component; and trigger an alert to deliver a new replaceable component according to the first subscription in response to a determination that the residual quantity of the printing material is less than a threshold.

13. The non-transitory machine-readable storage medium of claim 11, wherein instructions to monitor the image forming apparatus to determine the number of pages printed corresponding to the first subscription and the second subscription comprise instructions to:

obtain a number of pages printed corresponding to a job from the image forming apparatus upon execution of the job, the number of pages printed based on the first subscription or the second subscription;

update a first counter when the number of pages printed corresponds to the first subscription; and update a second counter when the number of pages printed corresponds to the second subscription.

14. The non-transitory machine-readable storage medium of claim 11, wherein instructions to associate the first subscription of the image forming apparatus to the second subscription comprise instructions to:

receive the request including unique identification information to associate the first subscription and the second subscription, the request is received from a user associated with the first subscription or from the enterprise associated with the second subscription; and associate the first subscription of the image forming apparatus to the second subscription of the enterprise upon authenticating the unique identification information.

15. The non-transitory machine-readable storage medium of claim 11, further comprising instructions to:

enable an administrator of the enterprise to divide the second subscription into a set of sub-subscriptions, wherein each sub-subscription is to define a threshold number of pages that can be printed, the threshold number of pages is less than the second number of pages, and wherein the first subscription of the image forming apparatus is associated with a sub-subscription of the set of sub-subscriptions in response to receiving the request.

\* \* \* \* \*